US006715814B1

United States Patent
Hoyle

(10) Patent No.: US 6,715,814 B1
(45) Date of Patent: Apr. 6, 2004

(54) VEHICLE CENTER CONSOLE WITH INTEGRALLY MOLDED HVAC AIR PASSAGE

(75) Inventor: Richard Hoyle, Orion, MI (US)

(73) Assignee: Air International (US), Inc., Auburn Hills, MI (US)

( * ) Notice: Subject to any disclaimer, the term of this patent is extended or adjusted under 35 U.S.C. 154(b) by 0 days.

(21) Appl. No.: 10/295,125

(22) Filed: Nov. 15, 2002

(51) Int. Cl.[7] ................................................. B60P 3/05
(52) U.S. Cl. ......................... 296/24.1; 296/208; 62/244
(58) Field of Search .............................. 296/24.1, 37.8, 296/208; 62/244, 243; 165/11.1, 42; 454/141, 160, 121, 142, 156; D12/415, 192

(56) References Cited

U.S. PATENT DOCUMENTS

| | | | | |
|---|---|---|---|---|
| 3,444,700 A | * | 5/1969 | Beyer | 62/244 |
| 4,022,599 A | * | 5/1977 | Wilson et al. | 62/244 |
| 4,170,259 A | * | 10/1979 | Kumagai et al. | 165/11.1 |
| 4,947,735 A | * | 8/1990 | Guillemin | 454/141 |
| 5,186,237 A | * | 2/1993 | Adasek et al. | 165/42 |
| 5,462,483 A | * | 10/1995 | Loup | 454/160 |
| 5,673,964 A | * | 10/1997 | Roan et al. | 296/208 |
| 5,897,155 A | * | 4/1999 | Kerner et al. | 296/37.8 |
| 5,997,078 A | * | 12/1999 | Beck et al. | 296/208 |
| 6,019,288 A | * | 2/2000 | Arold et al. | 62/244 |
| 6,071,591 A | * | 6/2000 | Dausch | 296/208 |
| 6,101,828 A | * | 8/2000 | Shikata et al. | 62/244 |
| 6,139,423 A | * | 10/2000 | Wadey | 454/142 |
| 6,338,514 B1 | * | 1/2002 | Arold et al. | 296/24.1 |
| 6,351,962 B1 | * | 3/2002 | Mizutani et al. | 62/244 |
| D459,288 S | * | 6/2002 | Tsay | D12/415 |
| 6,425,437 B2 | * | 7/2002 | Schmadl et al. | 62/244 |
| 6,427,760 B2 | * | 8/2002 | Klinger et al. | 62/244 |
| 6,482,082 B1 | * | 11/2002 | Derleth et al. | 454/156 |
| 6,508,701 B1 | * | 1/2003 | Foury et al. | 454/121 |
| D474,137 S | * | 5/2003 | Wyszogrod | D12/192 |

FOREIGN PATENT DOCUMENTS

JP 7 32859 * 2/1995

* cited by examiner

Primary Examiner—Kiran Patel
(74) Attorney, Agent, or Firm—Carlson, Gaskey & Olds

(57) ABSTRACT

A center console for a vehicle includes air vents at a rear end of the center console. An air passage to deliver heated or cooled air to the vents is formed within the center console by foam molded to the hard plastic which forms the center console housing. The foam is molded to include an internal passage that acts as the air passage.

14 Claims, 2 Drawing Sheets

VEHICLE CENTER CONSOLE WITH INTEGRALLY MOLDED HVAC AIR PASSAGE

BACKGROUND OF THE INVENTION

This invention relates to a center console molded from a relatively hard plastic wherein foam is also molded to the plastic to define air flow passages for use in the vehicle's HVAC system.

Vehicles are typically provided with a center console that is placed between the driver and passenger seats. This center console may often include various accessories such as a gearshift knob, storage space, etc. The center console is typically molded from pieces of relatively hard plastic. Further, it is often the case that air vents for directing hot or cool air to the rear of the vehicle are placed in the rear of the center console.

In the prior art, the passages for delivering the air from a source of heated or cool air pass through the center console to the vents at the rear. These vents have been molded of plastic and then attached to the center console housing plastic bodies. Thus, additional components and assembly steps are required to secure the air passage within the center console body. Also, the entire console has an undesirably high mass. Moreover, the air passages are often formed of a distinct plastic than the center console body. For that reason, the entire center console structure is not easily subject to recycling.

SUMMARY OF THE INVENTION

In a disclosed embodiment of this invention, the relatively hard plastic body which forms the center console is overmolded with a foam. When the center console is assembled, the foam attached to the hard plastic parts defines the air flow passage for delivering the heated or cool air to the vents in the center console.

In a most preferred embodiment of this invention, the foam and the plastic are formed of the same plastic family such that the console and passage are easily recyclable. In a most preferred embodiment, the foam and plastic are polypropylene.

In further features, mounting pins for mounting the various operable components such as doors, vents, evaporator, heater core, blower, etc. are formed in the hard plastic, and the foam is maintained away from the pin such that the door or vents can be mounted onto the pins.

The present invention thus discloses an improved console having an integrally molded foam air passage structure. This invention reduces the steps necessary for assembling the center console, and further provide a product which is more easily recyclable. Further, the number of components and the mass of the overall console are reduced. Additionally, the foam provides excellent insulation against heat loss and noise transmission.

DETAILED DESCRIPTION OF THE PREFERRED EMBODIMENT

Figure 1:
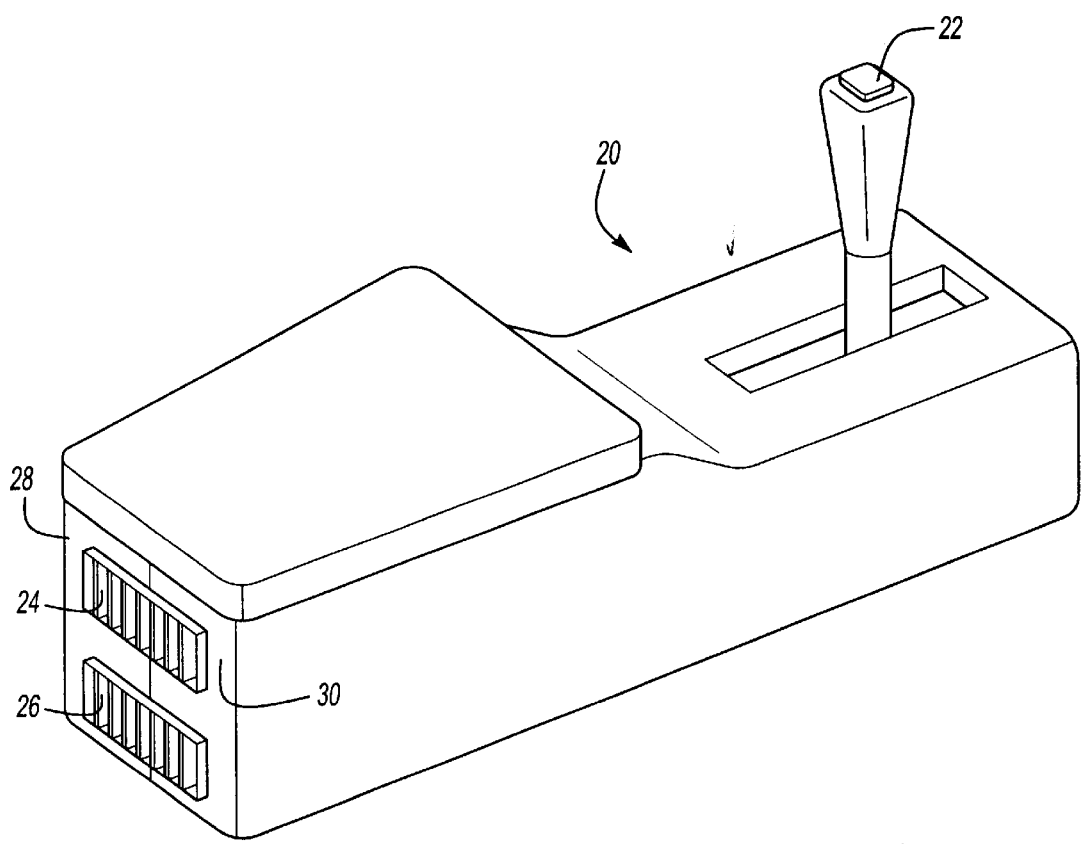
FIG. 1 shows a prior art center console.

A prior art console 20 is illustrated in the FIG. 1. A gearshift knob 22 is typically mounted in the center console. Vents 24 and 26 are mounted adjacent the rear of the console to direct heated or cooled air from the vehicle HVAC system into the rear of the vehicle cab. As shown, the console is typically formed of a pair of mating housing bodies 28 and 30. Typically the bodies 28 and 30 are molded from a relatively hard plastic.

Figure 2:
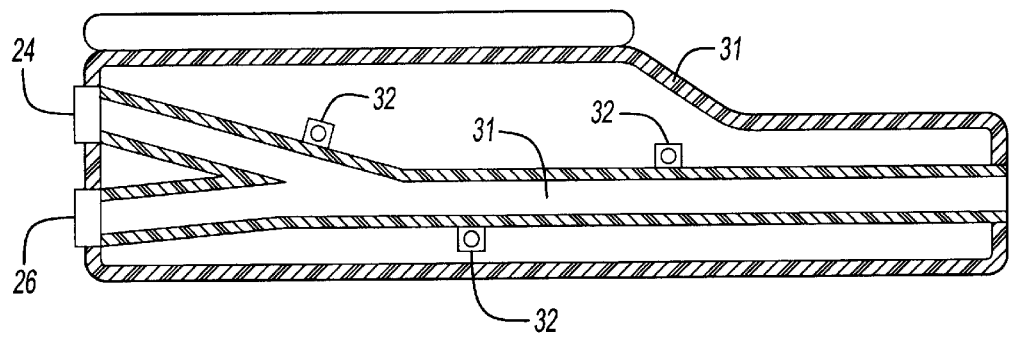
FIG. 2 is a simplified internal view of the prior art FIG. 1 console.

As shown in FIG. 2, an airflow passage 31 is mounted within the bodies. As shown somewhat schematically and simplified, pins 32 attach the air passage body 31 to the housing 28. Thus, the construction of the console requires the steps of attaching the airflow passage 31 to the housing bodies. Moreover, it is often the case that the air passage housing 31 is formed of a distinct plastic family than the housings 28 and 30. In that case, the entire console is not easily recyclable.

Figure 3:
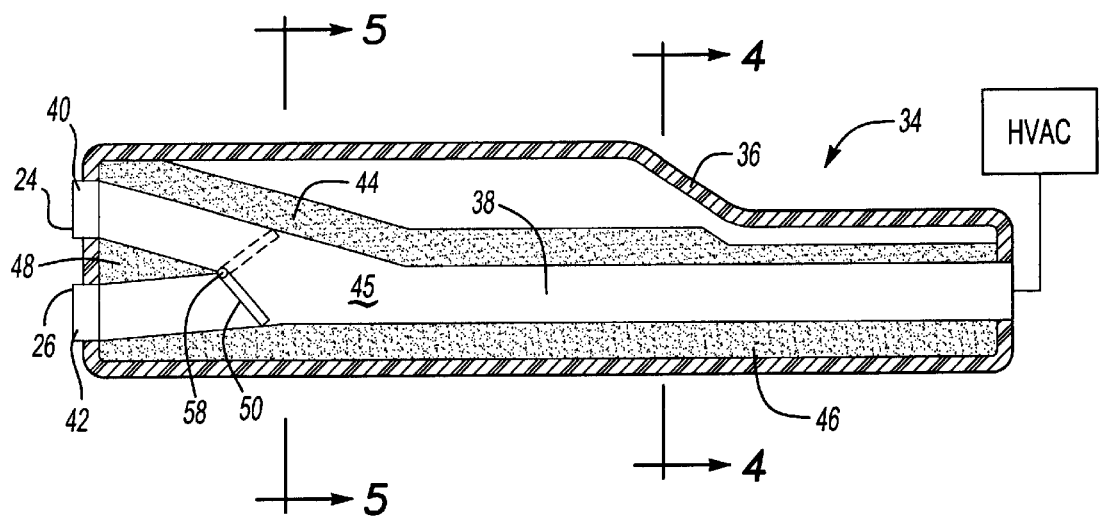
FIG. 3 shows an interior view of an inventive center console.

FIG. 3 shows an inventive console 34. As shown, a housing 36 includes an airflow passage 38. This passage provides air from the vehicle HVAC system to the rear openings 40 and 42 which receive the vents 24 and 26. As shown, there is foam 44 above the passage and foam 46 below the passage 38. An intermediate foam portion 48 forms the two flow sub passages that lead to the openings 40 and 42.

Figure 4:
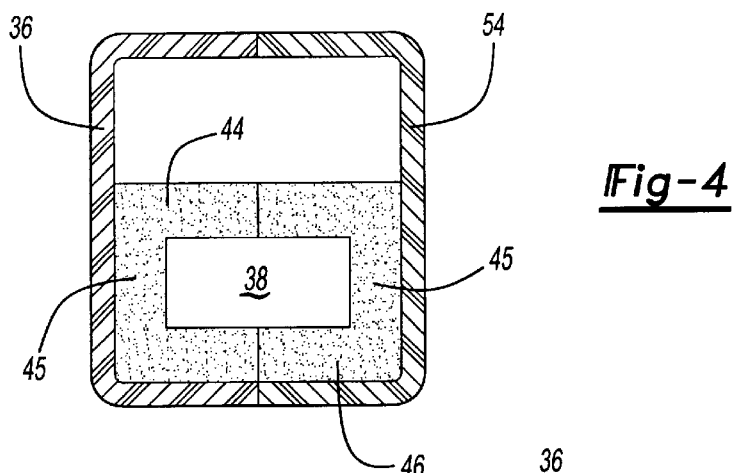
FIG. 4 is a cross-sectional view along line 4—4.

As shown in FIG. 4, there are side portions 45 of the foam that are may also be formed to the center console. As can be appreciated from this figure, the housing body 36 includes half of the passage and mates with the housing body 54. This is a very simplified view of one embodiment. Of course, more or less of the foam could be provided through a single housing body. Further, the console housing could come together in ways other than the simple two halves being placed together.

Figure 5:
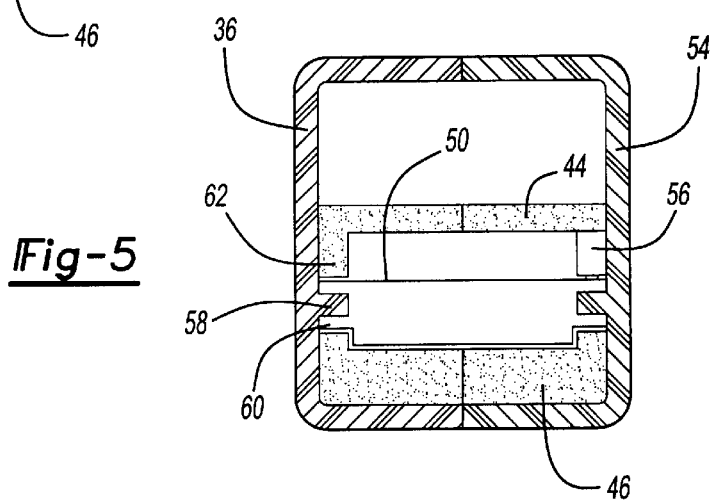
FIG. 5 is a cross-sectional view along line 5—5.

As shown in FIG. 5, where a component such as the door 50 is mounted, there may be clearance such that a mounting pin 60 formed on the door 50 can be mounted on a pin 58 formed in the hard plastic housing 36 and 54. As shown schematically, a solenoid motor 56 or some other type of motor can drive the door 50. This cross section would be distinct from the FIG. 4 cross section in that the foam on the sides 62 does not extend to the location of the pin 58 such that the pin 58 can be formed of the relatively hard plastic.

Although a preferred embodiment of this invention has been disclosed, a worker in this art would recognize that certain modifications would come within the scope of this invention. For that reason, the following claims should be studied to determined the true scope and content of this invention.

What is claimed is:

1. A center console for a vehicle comprising:
   an outer housing formed of a relatively hard plastic material and extending from a front end to a rear end;
   air openings adjacent said rear end of said housing; and
   foam molded to said hard plastic housing, said foam defining an internal air passage leading toward said air openings.

2. A center console as recited in claim 1, wherein said hard plastic housing has a rear face and said air openings are mounted in said rear face.

3. A center console as recited in claim 2, wherein vents are mounted in said air openings.

4. A center console as recited in claim 1, wherein there are a pair of said air openings.

5. A center console as recited in claim 4, wherein there are a pair of sub-passages leading to said pair of air openings, said pair of passages both being formed in said foam.

6. A center console as recited in claim 5, wherein a door pivots to control flow of air into one of said two sub passages, with a single passage leading to said pair of sub-passages.

7. A center console as recited in claim 6, wherein said door is mounted to pivot on pins formed on said hard plastic housing, said foam not being molded onto said pins.

8. A center console as recited in claim 7, wherein foam is formed on side walls of said hard plastic housing.

9. A center console as recited in claim 1, wherein said hard plastic housing is formed of two mating halves.

10. A center console as recited in claim 9, wherein said foam includes foam formed on each of said two mating halves, said foam coming together to form said air passage.

11. A center console as recited in claim 1, wherein said passage extends entirely to a forward end of said housing to communicate with a source of air.

12. A center console as recited in claim 1, wherein said foam and said hard plastic are formed from the same plastic family.

13. A center console as recited in claim 10, wherein said two mating halves include two hard plastic housing pieces that meet along a center line of said console, with said foam extending inward from each of said two mating halves to contact foam from the other of said two mating halves and form said air passage.

14. A center console as set forth in claim 13, wherein said foam on said two mating halves also meets at an approximate center line of said console.

* * * * *